Patented Dec. 22, 1953

2,663,738

UNITED STATES PATENT OFFICE 2,663,738

SUBSTITUTED PHOSPHACYCLOPENTENE SULFIDES AND PROCESS OF PREPARING THEM

William B. McCormack, Wilmington, Del., assignor to E. I. du Pont de Nemours & Company, Wilmington, Del., a corporation of Delaware No Drawing. Application August 7, 1951, Serial No. 240,809

6 Claims. (Cl. 260—607)

This invention relates to organic phosphorus compounds and particularly to a new class of phosphacyclopentene sulfides.

It has been found that certain phosphine sulfides in which the phosphorus is a member of a heterocyclic ring are highly useful as insecticides. It is an object of this invention to provide a new class of substituted phosphacyclopentene sulfides having insecticidal activity. A further object is to provide a process for the preparation of these compounds.

The products of this invention have the formula:

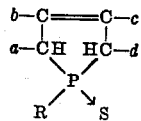

in which $a$, $b$, $c$ and $d$ represent members of the class consisting of hydrogen, alkyl, alkenyl, aryl, aralkyl, alkoxy, chlorine and bromine and polymethylene groups which together with two adjacent carbon atoms in the heterocyclic ring form a cycloaliphatic ring, and in which R represents a hydrocarbon radical or a hydrocarbon radical which is substituted by a halogen or by an alkoxy group. Compounds of this type in which no more than a total of 6 carbon atoms is present in the form of aliphatic substituents and no more than 3 aromatic rings are present are preferred.

These phosphine sulfides are prepared by reacting the corresponding substituted phosphacyclopentene dihalide, i. e., a compound having the formula:

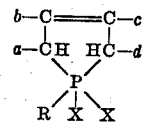

in which $a$, $b$, $c$, $d$ and R have the significance described above and X represents chlorine or bromine, with hydrogen sulfide.

The phosphacyclopentene dihalide is prepared by the reaction between a conjugated diene and a mono-substituted phosphorus dihalide, as disclosed in copending application Ser. No. 240,807. When the heterocyclic phosphine sulfide is to be the end product, it is most convenient not to isolate the intermediate phosphacyclopentene dihalide from the reaction mixture, but to treat the mixture with hydrogen sulfide to form the sulfide directly.

In a typical and representative embodiment of this invention, 1-phenyl-1-phospha-3-cyclopentene-P-sulfide is prepared by first reacting butadiene with dichlorophenylphosphine to form 1 - phenyl - 1 - phospha - 3 - cyclopentene - P - dichloride, and thereafter converting this product to the sulfide by adding hydrogen sulfide to the reaction mixture. These reactions are as follows:

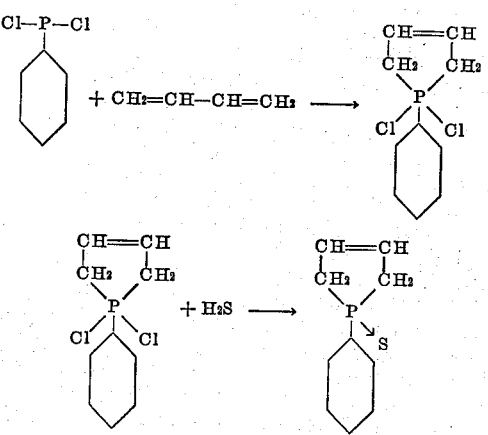

The conjugated dienes which are suitable for use in the first of these reactions are those Diels-Alder dienes which are free from carbonyl and cyano groups and which contain the grouping

in which grouping no carbon atom is a member of an aromatic ring and no three carbon atoms are members of the same cycloaliphatic ring, all substituents on the terminal carbon atoms of the said grouping being in the trans configuration. By the term "Diels-Alder diene" is meant any compound containing a conjugated double bond which is capable of taking part as the diene in the well known Diels-Alder reaction with unsaturated compounds such as maleic anhydride, acrolein and the like. The compounds which are capable of taking part in the Diels-Alder reaction are discussed in a chapter by Kurt Alder entitled "The Diene Synthesis" at page 381 in "Newer Methods of Preparative Organic Chemistry," Interscience Publishers, Inc. (1948). The Diels-Alder reaction is very general and most compounds containing conjugated double bonds are operative as the dienes in this synthesis, although as stated in the Alder chapter, some such compounds react very slowly or not at all. Compounds containing the butadiene skeleton and having large substituents in the 2 and 3 positions tend to react slowly, possibly because the bulky substituents interfere with free rotation around the central carbon to carbon linkage, and large or electronegative substituents in the 1 and 4 positions also play a part in retarding reaction.

The present invention contemplates the use of only those dienes which are capable of taking part in the ordinary Diels-Alder synthesis and which satisfy the other requirements set forth above. They must contain the grouping

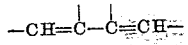

i. e., they must have the butadiene carbon skeleton and have no more than one substituent on each of the terminal carbon atoms in this skeleton. They must also be free from cyano (—C≡N) groups or from carbonyl (—C=O) groups such as occur in ketones, aldehydes, acids and esters. Compounds of this sort, such as ethyl sorbate

and 1-cyano-1,3-butadiene, react satisfactorily with the dihalophosphine but are difficult to isolate in monomeric form because of the tendency for the formation of macromolecules through polymerization.

The dienes suitable for use in forming the phosphacyclopentene dihalides contain a butadiene skeleton of which no carbon atom is part of an aromatic ring and no three carbon atoms are part of the same cycloaliphatic ring. Compounds in which only two of the carbon atoms are members of a cycloaliphatic ring or in which each of the double bonds is bridged with a polymethylene radical such as in the compound 1,1'-bis-cyclohexenyl, may be employed.

When the butadiene structure is substituted in its 1 or 4 position or both, it is necessary that the substituents have the trans configuration with respect to the other vinyl group. When the terminal substituent is in a cis position the reaction is greatly inhibited on account of the spatial relationships. The cis and trans configurations may be illustrated as follows:

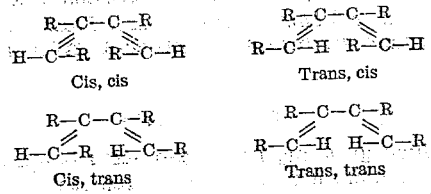

A diene which comprises a mixture of trans, trans isomers together with some of the other three types may be used in the reaction. In such a case the reaction takes place predominantly with the all-trans compound.

Conjugated dienes which are representative of the many compounds suitable for this reaction are as follows:

Butadiene
Mono-, di- and trimethylbutadienes
1,2,3,4-tetramethylbutadiene
Mono-, di- and triethylbutadienes
1,2,3,4-tetraethylbutadiene
Mono-, di- and tripropylbutadienes
1,2,3,4-tetrapropylbutadiene
Monovinylbutadienes
Monophenylbutadienes
2,3-diphenylbutadiene
Monotolylbutadienes
Monobenzylbutadienes
Myrcene (2-methyl-6-methylene-2,7-octadiene)
Alloocimene (2,6-dimethyl-2,4,6-octatriene)
1,1'-bis-cyclohexenyl
2-chlorobutadiene (chloroprene)
2-bromobutadiene
Monomethoxybutadienes
Monoethoxybutadienes
1,2-dimethylenecyclohexane
1-vinyl-1-cyclohexene In each of the compounds listed above in which more than one substituent is present, it is to be understood that each substituent is attached to a different carbon atom in the butadiene structure.

The preferred dienes are butadiene, chloroprene, isoprene and myrcene.

The dihalophosphine to be used in this process has the formula $RPX_2$, in which R is a hydrocarbon or substituted hydrocarbon radical and X is chlorine or bromine. The preferred dihalo compounds are dichlorophenylphosphine and dichloroethylphosphine and the corresponding dibromides. A wide variety of phosphine derivatives having the general formula shown may be employed. Representative compounds include those in which R represents an alkyl group such as methyl, ethyl, propyl or octyl; an aryl group such as phenyl or alpha or beta naphthyl; an alkaryl group such as o- or p-ethylphenyl, p-tolyl or p-xylyl; an aralkyl group such as benzyl or phenylethyl; an alkoxyaryl group such as o- or p-methoxyphenyl, o- or p-ethoxyphenyl or alpha-methoxynaphthyl; a haloaryl group such as o- or p-chloro- or bromophenyl or 3-chloro-4-methylphenyl; or a haloalkyl group such as beta-chloroethyl or bromoethyl or 2-chloro-1-octyl. In general, the lower members of these classes of radicals are most useful. These compounds are readily available from several well-known procedures, such as by the action of phosphorus trichloride on a compound having the formula RH, in the presence of aluminum chloride, or by the action of phosphorus trichloride on dialkyl or diaryl mercury. Kharasch in J. Org. Chem. 14, 429 (1949) describes a process for making dichloroethylphosphine from phosphorus trichloride and lead tetraethyl. The various procedures for making these compounds are summarized in Kosolapoff, Organophosphorus Compounds, Wiley, New York (1950), chapter 3.

The reaction between the diene and the dihalophosphine is ordinarily conducted at a temperature between 0° C. and 100° C. Higher temperatures may be used if the particular materials involved are not thereby decomposed. If any solid components are present in the reaction mixture the temperature is preferably maintained at a high enough level to keep the solids in a molten condition. The reaction will usually be carried out at atmospheric pressure although higher or lower pressures may be used.

The two reactants may be used in equimolar amounts or either may be present in excess. It is often convenient to employ an excess of one reactant or the other to serve as a reaction medium. As the diene is usually more easily recovered, this will be the ordinary choice for this purpose. The reaction may be conducted in the presence of a non-reactive medium such as petroleum ether, cyclohexane, benzene, diethyl ether, dioxane, carbon tetrachloride, chloroform and the like, although a higher rate of reaction is usually obtained when no inert diluent is used. In contrast, the rate of reaction is increased by use of an excess of one of the reactants. In order to obtain the dihalide as such, the mixture should be free of substances capable of converting the dihalide to the corresponding oxide, such as water, alcohols, carboxylic acids and the like.

Stirring may be advantageous to give better mixing after the product has begun to deposit. The dihalophosphine tends to be absorbed by the product and thus to become unavailable for further reaction. This effect is minimized by the use of efficient agitation.

Both monomeric and polymeric reaction products are usually formed during the course of the reaction and in order to obtain a satisfactory yield of the monomeric phosphine dihalide, it is often desirable to add a small amount of a polymerization inhibitor which does not react with phosphine dihalides and is a free-radical inhibitor. Suitable materials for this purpose are copper organic salts such as copper stearate or naphthenate, imines such as methylene blue and rhodamine, and polynitro compounds such as trinitrobenzene, dinitrobenzene and trinitrotoluene. Usually from 0.1 to 2.0 percent of the inhibitor based on the weight of the reaction mixture is sufficient. Certain of the diene reactants have less tendency toward polymerization than others and in some cases satisfactory yields of the monomeric product may be obtained in the absence of an inhibitor.

The speed of the reaction between the diene and the dihalophosphine varies considerably, depending on the specific nature of the reactants, the temperature, the presence or absence of a solvent and its identity, the amount of agitation and so on. In many cases, reaction is substantially complete in a few hours while in some cases four to five days are required. Many monosubstituted dienes react faster than does butadiene. Isoprene and 2-phenylbutadiene show this effect. Dibromophosphines produce faster reactions than do the corresponding dichloro compounds. The reaction between 1,2-dimethylenecyclohexane and dibromophenylphosphine is nearly complete within thirty minutes when carried out at 60° C.

Conversion of the heterocyclic phosphine dihalide to the corresponding phosphine sulfide is produced by treatment of the dihalide or of the reaction mixture containing it with hydrogen sulfide. This is conveniently accomplished by bubbling the hydrogen sulfide through the mixture containing the dihalide until conversion appears to be complete. In many cases this is indicated by the product going into solution. Completion of the reaction may also be ascertained by observing when no more hydrogen halide is evolved.

The reaction to form the sulfide is rapid and exothermic, and is operable at temperatures between 0° C. and 100° C. Because of the exothermic nature of the reaction, complete control at the higher temperatures sometimes requires special cooling or dilution with an inert solvent. The phosphine sulfide may be recovered by neutralizing the reaction mixture, saturating with salt, extracting with a solvent such as chloroform and distilling.

The process of this invention is illustrated by the following example:

*Example*

Two hundred grams (1.12 moles) of dichlorophenylphosphine and 38.0 grams (0.56 mole) of isoprene are mixed with 2.0 grams of copper stearate and allowed to stand for 18 days. A red viscous lower layer forms initially and gradually changes to yellow, compact needle clusters. The mixture is diluted with petroleum ether. The petroleum ether layer containing the excess phenylphosphorus dichloride is decanted and the crystals are washed with additional petroleum ether. They are then crushed, suspended in benzene, and treated with gaseous hydrogen sulfide by bubbling the gas through the suspension. The evolved hydrogen chloride is collected and titrated. Altogether 0.80 mole are evolved. All of the solid goes into solution. The benzene is removed by distillation under reduced pressure. The bulk of the residue distills at 173–175° C. (1.0 mm.), giving 93.1 grams of colorless oil which solidifies to a white solid upon cooling. This represents an 80% yield of the crude phosphine sulfide. There remain 39.7 grams of a glassy residue which is soluble in chloroform but insoluble in water or in caustic.

Eighty-eight grams of the white solid phosphine sulfide is dissolved in an equal weight of 95% alcohol at 50° C. and water is added until a cloudiness develops, at 45° C. By scratching and slow cooling to 0° C., there are obtained 74.8 grams of crystals melting at 66–69° C. Recrystallization gives 71.3 grams melting at 68.5–69.0° C. A portion of this product is sublimed to give an analytical sample which melts at 69–70° C. Its analysis is:

Calcd. for $C_{11}H_{13}SP$: S=15.4%; P=14.9%, C=63.5%, H=6.3%.
Found: S=15.8%; P=15.4%, C=63.1%, H=6.6%.

In the same way other heterocyclic phosphine sulfides may be prepared starting with any of the conjugated dienes listed above or with a dihalophosphine prepared therefrom. In such heterocyclic phosphine sulfides, carbon atoms in the heterocyclic ring may be unsubstituted or the ring may be substituted with alkyl, alkenyl, aryl, aralkyl, alkoxy, chlorine or bromine or polymethylene groups. As previously described, certain highly substituted dienes do not react readily. All substituted 1-phospha-3-cyclopentene-P-sulfides in which the substituents in the heterocyclic ring contain no more than six aliphatic carbon atoms and no more than three aromatic rings can be prepared according to the process herein described.

Some of the new substituted phosphacyclopentene sulfides of this invention are oils and some are crystalline solids at room temperature. They are very stable thermally, withstanding temperatures up to at least 300° C. The phosphine sulfide group is relatively inert chemically and is not easily reduced. Various chemical transformations of other parts of the molecule may be carried out without affecting the sulfur-phosphorus linkage. These compounds are effective insecticides and miticides and may be used in the synthesis of more complex compounds containing the phosphacyclopentene nucleus.

I claim:

1. A substituted phosphacyclopentene sulfide having the formula:

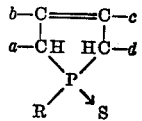

in which a, b, c, and d represent members of the class consisting of hydrogen and alkyl radicals, no more than a total of 6 carbon atoms being present in a, b, c and d, and in which R represents an aryl radical.

2. 1-phenyl-3-methyl-1-phospha-3-cyclopentene-P-sulfide, having the formula:

3. A process for preparing a substituted phosphacyclopentene sulfide having the formula:

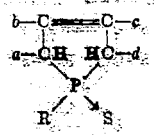

in which $a$, $b$, $c$, and $d$ represent members of the class consisting of hydrogen and alkyl radicals, no more than a total of 6 carbon atoms being present in $a$, $b$, $c$, and $d$, and in which R represents an aryl radical, which comprises reacting with hydrogen sulfide at a temperature between 0° and 100° C. a substituted phosphacyclopentene dichloride having the formula:

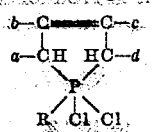

in which $a$, $b$, $c$, $d$, and R have the significance described above.

4. A process for preparing 1-phenyl-3-methyl-1-phospha-3-cyclopentene-P-sulfide having the formula:

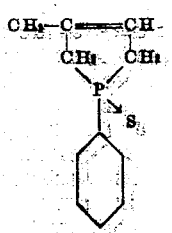

which comprises reacting at a temperature between 0° and 100° C. 1-phenyl-3-methyl-1-phospha-3-cyclopentene-P-dichloride having the formula:

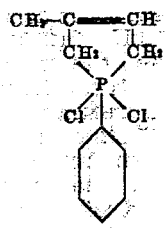

with hydrogen sulfide.

5. The process for preparing a substituted phosphacyclopentene sulfide having the formula:

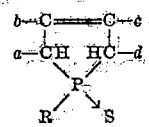

in which $a$, $b$, $c$ and $d$ represent members of the class consisting of hydrogen and alkyl radicals, no more than a total of 6 carbon atoms being present in $a$, $b$, $c$ and $d$, and in which R represents an aryl radical, which comprises contacting at a temperature between 0° and 100° C. a conjugated diene having the formula:

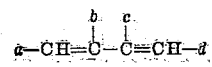

in which $a$, $b$, $c$ and $d$ have the significance described above with a monosubstituted phosphorus dichloride having the formula $RPCl_2$ in which R represents an aryl radical, and thereafter contacting the reaction product at a temperature between 0° and 100° C. with hydrogen sulfide.

6. The process for preparing 1-phenyl-3-methyl-1-phospha-3-cyclopentene-P-sulfide having the formula:

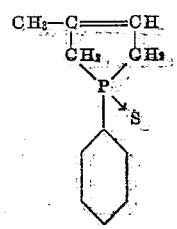

which comprises contacting isoprene with dichlorophenyl phosphine at a temperature between 0° and 100° C., and thereafter contacting the reaction product at a temperature between 0° and 100° C. with hydrogen sulfide.

WILLIAM B. McCORMACK.

No references cited.